United States Patent
Kindo et al.

(10) Patent No.: US 11,584,399 B2
(45) Date of Patent: Feb. 21, 2023

(54) DRIVING HANDOVER CONTROL DEVICE AND DRIVING HANDOVER CONTROL METHOD

(71) Applicant: TOYOTA JIDOSHA KABUSHIKI KAISHA, Toyota (JP)

(72) Inventors: Toshiki Kindo, Yokohama (JP); Yuji Suzuki, Toyota (JP); Mutsumi Matsuura, Okazaki (JP); Tomoaki Miyazawa, Nagoya (JP); Shunsuke Tanimori, Susono (JP); Kuniaki Jinnai, Nagoya (JP); Kohta Tarao, Nagoya (JP); Yoshihiro Maekawa, Toyota (JP); Hiroki Awano, Tokyo-to (JP); Tae Sugimura, Miyoshi (JP); Tomoyuki Kuriyama, Hadano (JP); Yusuke Yokota, Susono (JP); Makoto Matsushita, Ichinomiya (JP); Yasuki Nakagawa, Toyota (JP); Atsushi Hanawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 16/933,543

(22) Filed: Jul. 20, 2020

(65) Prior Publication Data

US 2021/0039680 A1 Feb. 11, 2021

(30) Foreign Application Priority Data

Aug. 6, 2019 (JP) .............................. JP2019-144752

(51) Int. Cl.
*B60W 60/00* (2020.01)
*G05D 1/00* (2006.01)
(Continued)

(52) U.S. Cl.
CPC ........ *B60W 60/0053* (2020.02); *B60W 40/08* (2013.01); *B60W 50/0205* (2013.01);
(Continued)

(58) Field of Classification Search
None
See application file for complete search history.

(56) References Cited

U.S. PATENT DOCUMENTS 11,188,074 B1\* 11/2021 Benavidez ........... G05D 1/0088
11,262,752 B2\* 3/2022 Mori ................... B60W 50/082
(Continued)

FOREIGN PATENT DOCUMENTS

JP 2006-301723 A 11/2006
JP 2015-076027 A 4/2015
(Continued)

*Primary Examiner* — James J Lee
*Assistant Examiner* — David Hatch
(74) *Attorney, Agent, or Firm* — Oliff PLC

(57) ABSTRACT

A driving handover control device includes a memory and a processor coupled to the memory. In a case in which driving is handed over from a first state in which a vehicle is traveling by remote driving by a first driver from outside the vehicle or by occupant driving by the first driver in the vehicle, to a second state in which the vehicle travels by the remote driving or the occupant driving by a second driver who is different from the first driver, the processor is configured to cause transition from the first state to a third state in which the vehicle is caused to travel by automatic driving, and then cause transition from the third state to the second state.

14 Claims, 4 Drawing Sheets

(51) Int. Cl.
*B60W 50/14* (2020.01)
*B60W 50/02* (2012.01)
*B60W 40/08* (2012.01)

(52) U.S. Cl.
CPC ........ *B60W 50/14* (2013.01); *B60W 60/0051* (2020.02); *B60W 60/0057* (2020.02); *G05D 1/0011* (2013.01); *G05D 1/0022* (2013.01); *B60W 2554/80* (2020.02); *G05D 2201/0213* (2013.01)

(56) References Cited

U.S. PATENT DOCUMENTS

| | | | |
|---|---|---|---|
| 11,397,432 B2 * | 7/2022 | Brooks | G05D 1/0077 |
| 2014/0207535 A1 * | 7/2014 | Stefan | G06Q 10/06398 |
| | | | 701/1 |
| 2019/0039618 A1 | 2/2019 | Mori | |
| 2019/0118833 A1 * | 4/2019 | Goto | B60W 50/14 |
| 2019/0291744 A1 | 9/2019 | Mimura et al. | |
| 2020/0010061 A1 * | 1/2020 | Tiwari | B60W 10/192 |
| 2021/0116907 A1 * | 4/2021 | Altman | H04Q 9/00 |

FOREIGN PATENT DOCUMENTS

| | | |
|---|---|---|
| JP | 2017-159885 A | 9/2017 |
| WO | 2018/087862 A1 | 5/2018 |

\* cited by examiner

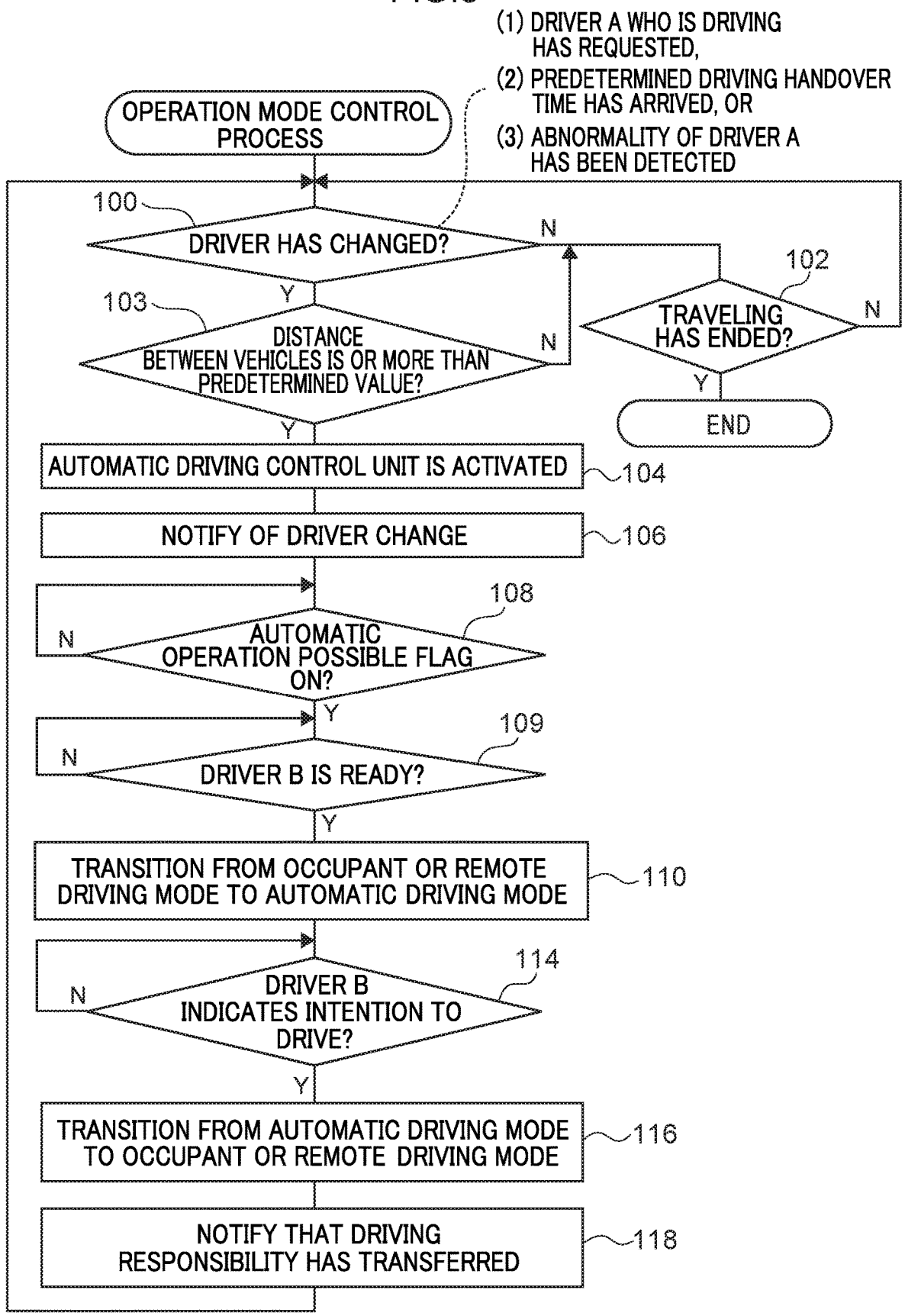

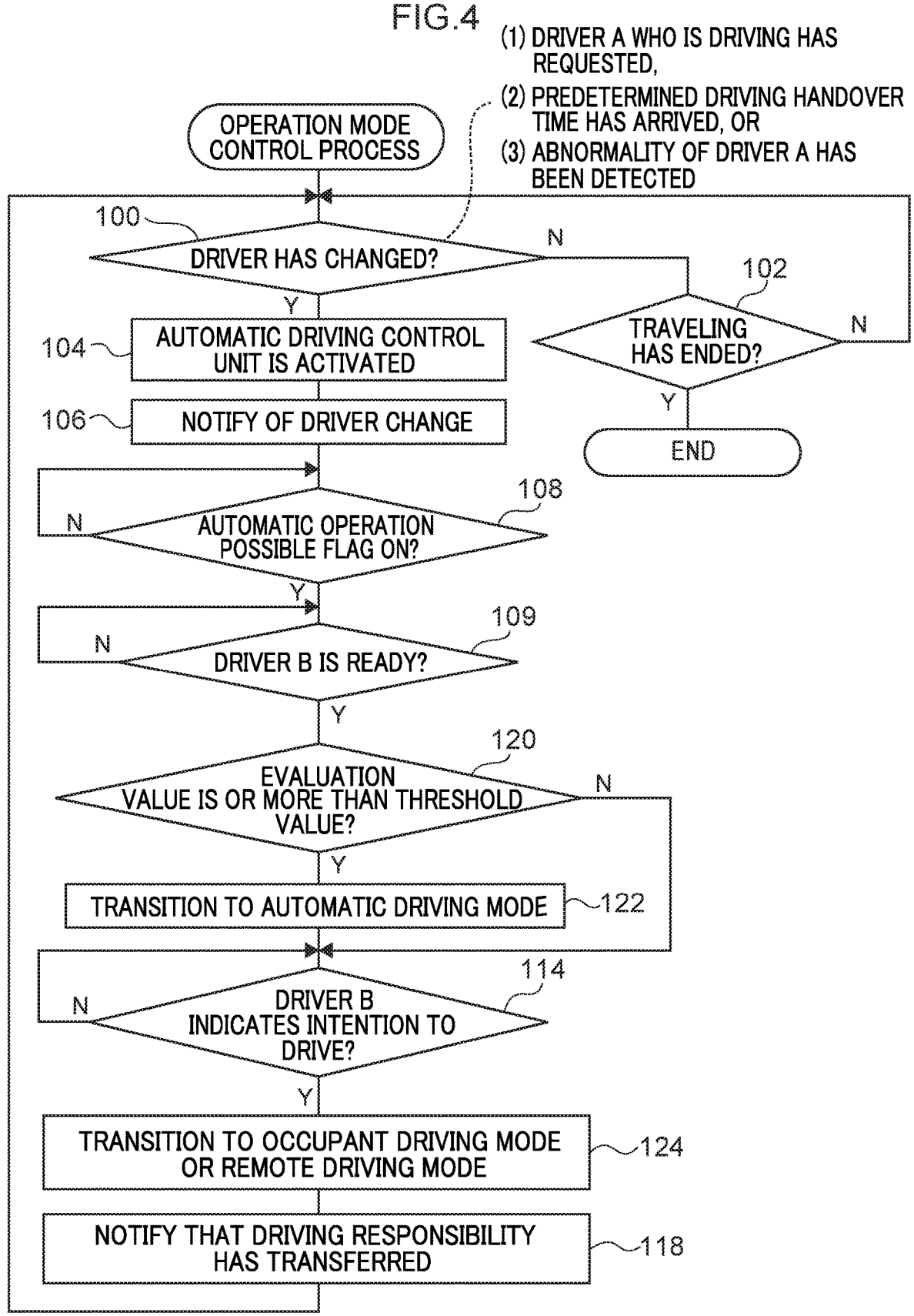

DRIVING HANDOVER CONTROL DEVICE AND DRIVING HANDOVER CONTROL METHOD

CROSS-REFERENCE TO RELATED APPLICATION

This application is based on and claims priority under 35 USC 119 from Japanese Patent Application No. 2019-144752 filed on Aug. 6, 2019, the disclosure of which is incorporated by reference herein.

BACKGROUND

Technical Field

The present disclosure relates to a driving handover control device and a driving handover control method.

Related Art

Japanese Patent Application Laid-Open No. 2006-301723 discloses a technique in which it is possible to acquire the status of a driver while the driver is operating the vehicle on behalf of the user of the vehicle and, in the case in which it is determined that it is not possible for the driver to continue operating the vehicle, switch to another operator other than the operator.

According to the technique disclosed in Japanese Patent Application Laid-Open No. 2006-301723, when the first driver determines that it is impossible for the second driver to continue driving, since the first driver directly takes over the driving from the second driver, there is a risk that the driver may feel uncomfortable due to interference between the driving operation of the first driver and the driving operation of the second driver.

SUMMARY

An embodiment of the present disclosure is a driving handover control device that includes a memory and a processor coupled to the memory, wherein, in a case in which driving is handed over from a first state in which a vehicle is traveling by remote driving by a first driver from outside the vehicle or by occupant driving by the first driver in the vehicle, to a second state in which the vehicle travels by the remote driving or the occupant driving by a second driver who is different from the first driver, the processor is configured to cause transition from the first state to a third state in which the vehicle is caused to travel by automatic driving, and then cause transition from the third state to the second state.

BRIEF DESCRIPTION OF THE DRAWINGS

FIG. 3 is a flowchart illustrating an operation mode control process according to a second embodiment.

FIG. 4 is a flowchart illustrating an operation mode control process according to a third embodiment.

DETAILED DESCRIPTION

Here below, an example of an embodiment of the present disclosure is described in detail with reference to the drawings.

First Embodiment

Figure 1:
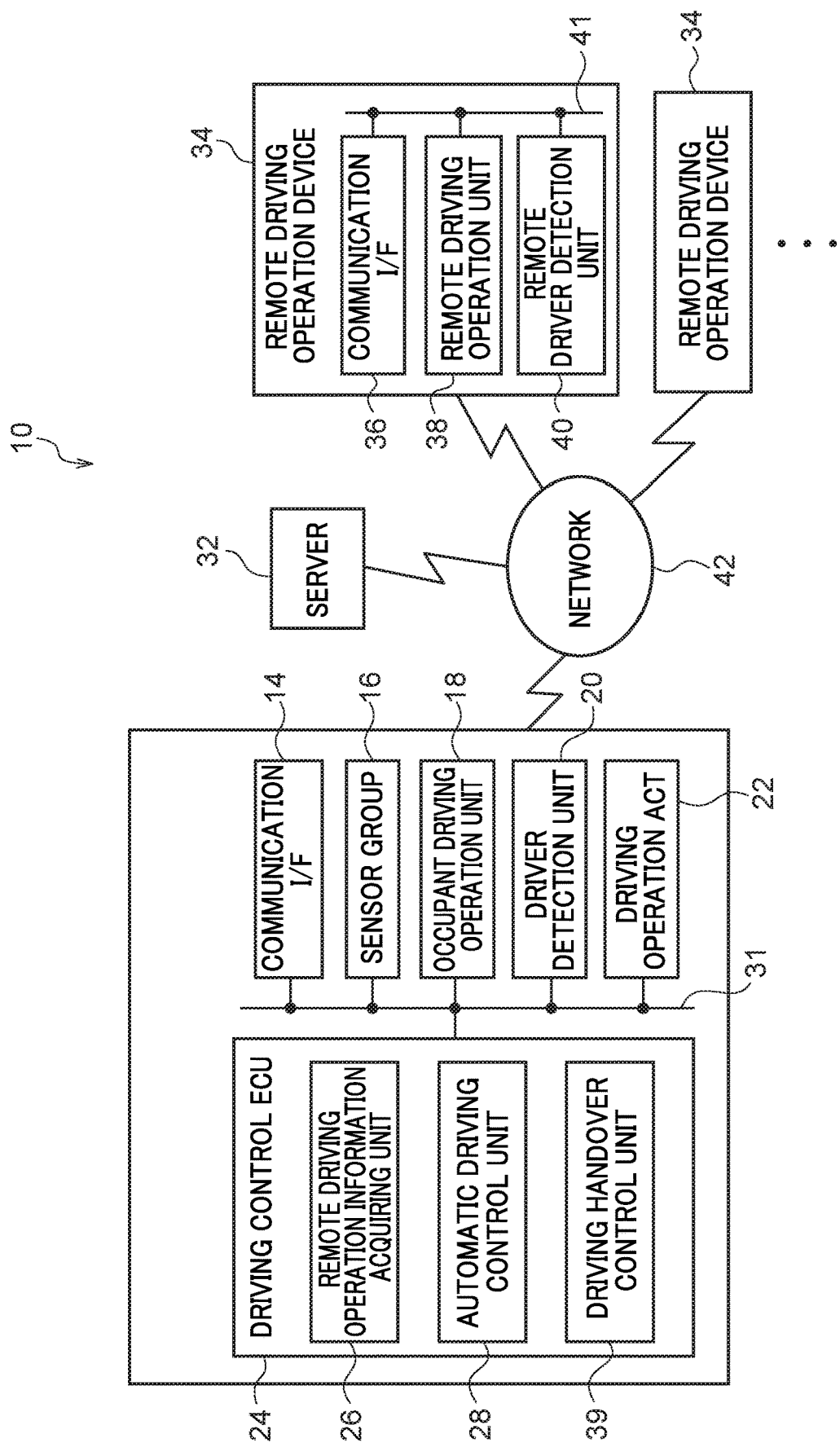
FIG. 1 is a block diagram illustrating a schematic configuration of an operation control system according to an embodiment.

As shown in FIG. 1, the driving control system 10 according to the embodiment includes an in-vehicle system 12 mounted on a vehicle, a plurality of remote driving operation devices 34, and a server 32. The in-vehicle system 12, the remote driving operation device 34, and the server 32 are communicably connected via a network 42.

The vehicle equipped with the in-vehicle system 12 is provided with an occupant driving mode, a remote driving mode, and an automatic driving mode as driving modes for driving the vehicle. The occupant driving mode is a mode in which an occupant riding in the vehicle operates the occupant driving operation unit 18 described later to drive the vehicle. The remote driving mode is a mode in which a remote driver existing outside the vehicle operates a remote driving operation unit 38 described later of the remote operation device 34 to remotely drive the vehicle. The automatic driving mode is a mode in which an automatic driving control unit 28 described later automatically drives the vehicle, that is, makes the vehicle run.

The in-vehicle system 12 includes a communication I/F 14, a sensor group 16, an occupant driving operation unit 18, a driver detection unit 20, a driving operation ACT 22, and a driving control ECU 24, which are connected to each other via a bus 31. I/F stands for Interface, ACT stands for Actuator, and ECU stands for Electronic Control Unit.

The communication I/F 14 of the in-vehicle system 12 communicates with the remote operation device 34 and the server 32 via the network 42. The sensor group 16 includes a plurality of types of sensors that acquire information indicating the state of the surrounding environment of the vehicle, and the surrounding environment of the vehicle acquired by the sensor group 16 is used for automatic operation control and the like by the automatic operation control unit 28 described later. An example of the sensors included in the sensor group 16 is a GNSS device, a vehicle-mounted communication device, a navigation system, a radar device, and a camera. GNSS stands for Global Navigation Satellite System.

The GNSS device receives GNSS signals from plural GNSS satellites, and measures the position of the own vehicle. The accuracy of measurement improves in accordance with an increase in the number of GNSS signals that the GNSS device 16 can receive. The in-vehicle communication device is a communication device that performs at least one of inter-vehicle communication with another vehicle and road-to-vehicle communication with a roadside device via the communication I/F 14. The navigation system includes a map information storage device that stores map information and carries out processing that displays the position of the own vehicle on a map and that guides the own vehicle along the path to the destination on the basis of the position information obtained from the GNSS device and the map information stored in the map information storage device.

The radar device includes plural radar devices whose detection ranges differ from one another, detects objects such as pedestrians and other vehicles and the like that exist at the periphery of the own vehicle, and acquires relative positions and relative speeds between the detected objects and the own vehicle. Further, the radar device incorporates therein a processing device that processes the results of detecting objects at the periphery. On the basis of changes in the relative positions and the relative speeds between individual objects that are included in recent, plural results of detection, and the like, this processing device excludes noise, roadside objects such as guard rails and the like from objects of monitoring, and tracks and monitors pedestrians and other vehicles and the like as objects of monitoring. Further, the radar device outputs information of the relative positions and the relative speeds between the individual objects of monitoring, and the like. The camera captures images of the periphery of the own vehicle by plural cameras, and outputs the captured images.

The occupant driving operation unit 18 includes a throttle pedal, a brake pedal, a steering wheel, and a display device provided in a vehicle on which the in-vehicle system 12 is mounted. The occupant driving operation unit 18 is operated by a driver in the vehicle when the vehicle is in the occupant operation mode. Further, the occupant driving operation unit 18 includes a sensor for detecting the operation amount of each of the throttle pedal, the brake pedal, and the steering wheel, and outputs the operation amount of each pedal and the steering wheel by the driver as the occupant operation information. The occupant driving operation unit 18 is an example of a driving operation detection unit.

The driver detection unit 20 detects the state of the driver who operates the occupant driving operation unit 18. The state of the driver detected by the driver detection unit 20 is, for example, biological information of the driver such as the driver's pulse and blood pressure, posture of the driver such as whether or not the driver is holding the steering wheel of the occupant driving operation unit 18, and the driver's operation force such as the steering force by which the driver operates the steering wheel of the occupant driving operation unit 18, and the like. In addition, the driver detection unit 20 determines the presence or absence of an abnormality of the driver by comparing the result of detecting the state of the driver with a threshold, and outputs an abnormality detection signal when the abnormality of the driver is detected. Note that the driver detection unit 20 is an example of an abnormality detection unit.

The driving operation ACT 22 includes a throttle ACT for changing a throttle opening amount of the own vehicle, a brake ACT for changing a braking force generated by a braking device of the own vehicle, and a steering ACT for changing a steering amount by a steering device of the own vehicle.

The operation control ECU 24 includes a CPU, a memory such as a ROM and a RAM, a non-volatile storage device that is a non-temporary recording medium such as an HDD or an SSD, and a communication I/F. CPU stands for a Central Processing Unit, ROM stands for a Read Only Memory, RAM stands for a Random Access Memory, HDD stands for a Hard Disk Drive, and SSD stands for a Solid State Drive. The driving control ECU 24 reads a predetermined program stored in the storage device into the memory, loads the program, and by being executed by a CPU, functions as the remote driving operation information acquiring unit 26, the automatic driving control unit 28, and the driving handover control unit 30.

When the vehicle is in the remote driving mode, the remote driving operation information obtaining unit 26 obtains remote driving operation information indicating an operation amount of a remote driving operation unit 38 described later of the remote driving operation device 34 by the remote driver.

When the vehicle is in the automatic driving mode, the automatic driving control unit 28 performs an automatic driving control process to cause the vehicle to automatically run by generating and outputting automatic driving control information to control the operation of each ACT of the driving operation ACT 22 based on the information which is obtained by the plurality of types of sensors of the sensor group 16 and which indicates the state of the surrounding environment of the vehicle.

When the vehicle is in the occupant driving mode, by supplying the occupant driving operation information output from the occupant driving operation unit 18 to the driving operation ACT 22, the driving handover control unit 30 activates each of the ACTs of the driving operation ACT22 in accordance with the operation of the occupant driving operation unit 18 by the driver. In this case, the vehicle travels in accordance with the operation of the occupant driving operation unit 18 by the driver riding in the vehicle.

When the vehicle is in the remote driving mode, by supplying the remote driving operation information acquired by the remote driving operation information acquiring unit 26 to the driving operation ACT 22, the driving handover control unit 30 activates each of the ACTs of the driving operation ACT22 in accordance with the operation of the remote driving operation unit 38 by the remote driver. In this case, the vehicle travels in response to the operation of the remote driving operation unit 38 by the remote driver.

In addition, when the vehicle is in the automatic driving mode, by supplying the automatic driving control information output from the automatic driving control unit 28 to the driving operation ACT 22, the driving handover control unit 30 activates each of the ACTs of the driving operation ACT22 in accordance with the automatic driving control of the automatic driving control unit 28. In this case, the vehicle travels according to the automatic driving control by the automatic driving control unit 28.

Further, by an operation mode control process described later, the driving handover control unit 30 controls the takeover of the operation of the vehicle by switching the operation mode of the vehicle as necessary. This process is explained in detail later.

The remote driving operation device 34 includes a communication I/F 36, a remote driving operation unit 38, and a remote driver detection unit 40, which are connected to each other via a bus 41. The communication I/F 36 communicates with the in-vehicle system 12 and the server 32 via the network 42.

The remote driving operation unit 38 includes a throttle pedal, a brake pedal, a steering wheel, and a display device. The display device displays an image representing a situation around the vehicle captured by a camera included in the sensor group 16 of the in-vehicle system 12. The throttle pedal, the brake pedal, and the steering wheel of the remote driving operation unit 38 are operated by the remote driver when the remote driver remotely drives the vehicle in the remote driving mode. The remote driving operation unit 38 includes a sensor for detecting the operation amount of each of the throttle pedal, the brake pedal, and the steering wheel, and sends the operation amount of each pedal and the steering wheel by the remote driver to the in-vehicle system 12 as remote operation information. The remote driving operation unit 38 is an example of a driving operation detecting unit.

The remote driver detecting unit 40 detects the state of the remote driver operating the remote driving operation unit 38, for example, the biological information of the remote driver, the posture of the remote driver, and the operating force of the remote driver in the same manner as the driver detection unit 20. In addition, the remote driver detection unit 40 determines the presence or absence of an abnormality of the remote driver by comparing the result of detecting the state of the remote driver with a threshold, and outputs an abnormality detection signal when the abnormality of the driver is detected. Note that the remote driver detection unit 40 is an example of an abnormality detection unit.

In the present embodiment, a plurality of remote driving operation devices 34 are provided, and the server 32 selects the remote driving operation device 34 that is a remote driver performing remote driving when the vehicle runs in the remote driving mode, and the remote operation of the vehicle is performed by the selected remote driving operation device 34.

Figure 2:
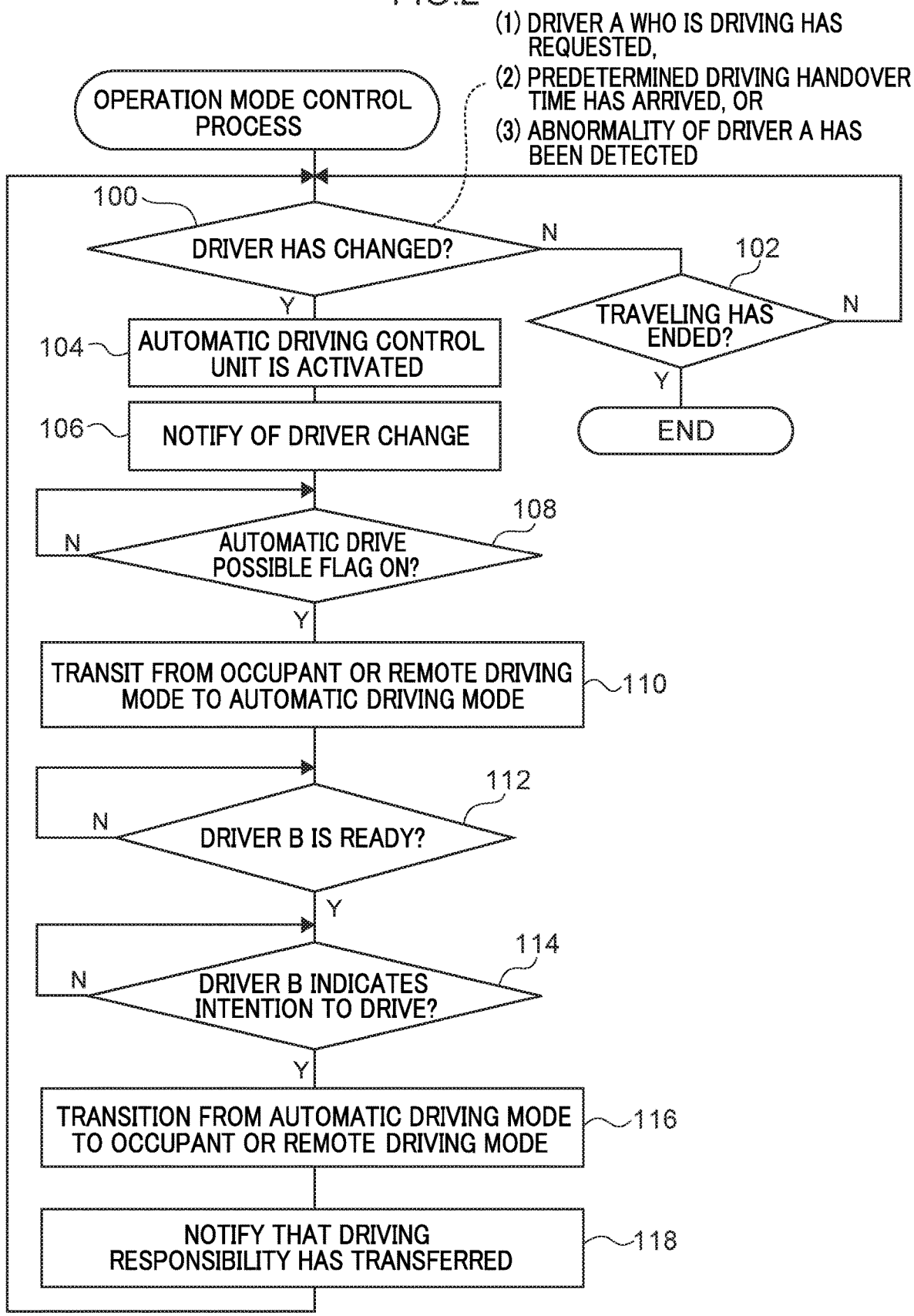
FIG. 2 is a flowchart illustrating an operation mode control process according to the first embodiment.

Next, as an operation of the first embodiment, an operation mode control process performed by the driving handover control unit 30 will be described with reference to FIG. 2. The operation mode control process is started when the driver A starts running the vehicle in the occupant driving mode or the remote driving mode, and continues while the vehicle is running.

In step 100, the driving handover control unit 30 determines whether to change the driver who drives the vehicle. The first condition of the determination in step 100 is that a first operation, meaning that a driver A who is driving the vehicle requests a handover, is performed, and the second condition is that a time for a predetermined driver change has come. The third condition is that an abnormality of the driver A driving the vehicle is detected by the driver detection unit 20 or the remote driver detection unit 40, and in a case in which any one of the first to third conditions is satisfied, the determination in step 100 is affirmed. Note that the first operation includes, for example, an operation of turning on a predetermined button of the occupant driving operation unit 18 or the remote operation unit 38 by the driver A.

When the determination in step 100 is negative, the process proceeds to step 102, and in step 102, the driving handover control unit 30 determines whether or not to stop traveling of the vehicle. If the determination in step 102 is also negative, the process returns to step 100, and steps 100 and 102 are repeated until the determination in step 100 or 102 is affirmed. During this time, the driver A continues driving the vehicle in the occupant driving mode or the remote driving mode. This state is an example of the first state. If the determination in step 102 is affirmed, the operation mode control process ends.

If any of the above-described first to third conditions is satisfied, the determination in step 100 is affirmed, and the process proceeds to step 104. In step 104, the driving handover control unit 30 activates the automatic operation control unit 28. When activated, the automatic operation control unit 28 performs processing such as initial setting, and when automatic operation control is possible, sets the automatic operation possible flag to ON.

In the next step 106, the driving handover control unit 30 recognizes the driver B who takes over driving of the vehicle from the driver A. For example, when the driver A is driving the vehicle in the occupant driving mode, the driver 32 selects the driver B who remotely drives the vehicle through the server 32. Further, for example, when the driver A is remotely driving the vehicle in the remote driving mode, in a case in which it is determined that the occupant of the vehicle can drive the vehicle as the driver B, the occupant is selected as the driver B or, via the server 32, a driver B who drives the vehicle by remote driving, that is, a driver different from the driver A, is selected. Then, the driving handover control unit 30 notifies, through the display device of the occupant driving operation unit 18 or the display device of the remote driving operation unit 38, the recognized driver B that the driving of the vehicle is to be changed. Thereby, the driver B prepares to drive the vehicle, for example, adjusts the seat.

In step 108, the driving handover control unit 30 determines whether the automatic operation control unit 28 is in a state where the automatic operation control unit 28 can perform the automatic drive control by the automatic operation possible flag of the automatic operation control unit 28 being turned on. If the determination in step 108 is negative, the determination in step 108 is repeated until the determination in step 108 is affirmative. When the automatic operation possible flag is turned on, the determination in step 108 is affirmed, and the process proceeds to step 110.

In step 110, the driving handover control unit 30 switches from a state of supplying occupant driving operation information output from the occupant driving operation unit 18 or the remote driving operation information acquired by the remote driving operation information acquiring unit 26 in response to the operation of the driver A to the driving operation ACT 22, to a state of supplying the automatic operation control information output from the automatic operation control unit 28 to the driving operation ACT 22. Thereby, the driving mode of the vehicle changes from the occupant driving mode or the remote driving mode by the driver A to the automatic driving mode. This is an example of the transition from the first state to the third state.

In step 112, the driving handover control unit 30 determines whether or not the driver B has completed preparations for driving the vehicle based on whether or not the driver detection unit 20 or the remote driver detection unit 40 detects that the driver B is holding the steering wheel of the occupant driving operation unit 18 or the remote driving operation unit 38. If the determination in step 112 is negative, the determination in step 112 is repeated until the determination in step 112 is affirmative.

If the determination in step 112 is affirmative, the process proceeds to step 114, and in step 114, the driving handover control unit 30 determines whether or not the second operation, meaning the driver B indicating an intention to drive the vehicle, has been performed. Note that the second operation includes, for example, an operation of turning on a predetermined button of the occupant driving operation unit 18 or the remote operation unit 38 by the driver A. If the determination in step 114 is negative, the determination in step 114 is repeated until the determination in step 114 is affirmative.

If the result of the determination in step 114 is affirmative, the process proceeds to step 116. In step 116, the driving handover control unit 30 switches from a state of supplying automatic driving control information output from the automatic driving control unit 28 to the driving operation ACT 22 to a state of supplying occupant driving operation information output from the occupant driving operation unit 18 or the remote driving operation information acquired by the remote driving operation information acquiring unit 26 in response to the operation of the driver A to the driving operation ACT 22. As a result, the driving mode of the vehicle changes from the automatic driving mode to the occupant driving mode or the remote driving mode by the driver B. This is an example of the transition from the third state to the second state.

In step 118, the driving handover control unit 30 notifies the driver A that the responsibility of driving has been transferred from the driver A to the driver B through the display device of the occupant driving operation unit 18 or the display device of the remote driving operation unit 38. When the processing of step 118 is performed, the process returns to step 100, and the steps after step 100 are repeated.

As described above, in the first embodiment, in the case that driving is taken over from the first state in which the vehicle is running by the remote driving or the occupant driving by the driver A to the second state in which the vehicle is caused to run by remote driving or the occupant driving by the driver B, the driving handover control unit 30 causes transition from the third state to the second state after causing transition from the first state to the third state in which the automatic driving control unit 28 causes the vehicle to run by automatic driving. Thereby, it is possible to suppress the driving operation of the first driver and the driving operation of the second driver from interfering with each other, and it is possible to suppress the drivers from feeling uncomfortable.

Further, in the first embodiment, when automatic driving by the automatic driving control unit 28 becomes possible, the driving handover control unit 30 causes transition from the first state to the third state, and causes transition from the third state to the second state when the remote driving or the occupant driving by the driver B becomes possible and the driver B indicates an intention to drive. As a result, it is possible to cause a quick transition from the first state to the third state, and to cause a transition from the third state to the second state while ensuring safety.

In the first embodiment, when the transition to the second state is completed, the driving handover control unit 30 notifies the driver A that the responsibility for driving the vehicle has been transferred to the driver B. Thus, when the transition to the second state is completed, the driver A can be made aware that the responsibility for driving the vehicle has been transferred to the driver B.

Further, in the first embodiment, when any of the first condition that the driver A has performed the first operation meaning that the driver A requests the takeover of the driving, the second condition that the predetermined driving takeover time from the driver A to the driver B has come, or the third condition that an abnormality of the driver A is detected by the driver detection unit 20 or the remote driver detection unit 40 is satisfied, and the driver is replaced. Accordingly, when it is desirable to take over the driving from the driver A to the driver B, that is, when any of the above first to third conditions is satisfied, taking over of the driving from the driver A to the driver B is performed.

Second Embodiment

Explanation follows regarding a second exemplary embodiment of the present disclosure. Since the second embodiment has the same configuration as that of the first embodiment, the same reference numerals are given to the respective same portions, and the description of those similar portions is omitted. Hereinafter, with reference to FIG. 3, portions of the operation mode control processing according to the second embodiment which are different from the operation mode control processing of FIG. 2 described in the first embodiment are explained.

In the driving mode control process according to the second embodiment, the process proceeds to step 103 when the determination in step 100 is affirmative due to the timing to change the driver that drives the vehicle coming. Then, in step 103, the driving handover control unit 30 determines whether or not the distance between the vehicle and another vehicle detected by the radar device of the sensor group 16 is equal to or greater than a predetermined value. If the determination of the step 103 is negative, the process proceeds to step 102.

As a result, even when the timing to change the driver that drives the vehicle comes, if the distance between the vehicle and another vehicle is smaller than the predetermined value, the driver that drives the vehicle is not changed. If the distance to the other vehicle is equal to or greater than the predetermined value, the determination in step 103 is affirmed, and the process proceeds to step 104.

Further, in the operation mode control process according to the second embodiment, when the determination of step 108 is confirmed by the automatic operation possible flag of the automatic operation control unit 28 being turned on, the process proceeds to step 109. In step 109, the driving handover control unit 30 determines whether or not the driver B has completed preparations for driving the vehicle based on whether or not the driver detection unit 20 or the remote driver detection unit 40 detects that the driver B is holding the steering wheel of the occupant driving operation unit 18 or the remote driving operation unit 38.

If the determination in step 109 is negative, the determination in step 109 is repeated until the determination in step 109 is affirmative. If the determination in step 109 is affirmative, the process proceeds to step 110, in which the driving mode of the vehicle is shifted from the occupant driving mode or the remote driving mode by the driver A to the automatic driving mode. In the second embodiment, when the driver B performs the second operation meaning that the driver B indicates intention to drive the vehicle, the driving mode of the vehicle transitions from the automatic driving mode to the occupant driving mode by the driver B or the remote driving mode by the determination in the next step 114 being affirmed and the process proceeds to step 116.

As described above, in the second embodiment, when automatic driving by the automatic driving control unit 28 becomes possible and remote driving or occupant driving by the driver B becomes possible, the driving handover control unit 30 causes transition from the first state to the third state and causes transition from the third state to the second state when the driver B indicates an intention to drive. Thereby, it is possible to cause a transition from the first state to the third state while ensuring safety, and to cause a quick transition from the third state to the second state.

In the second embodiment, the driver is changed when the inter-vehicle distance with another vehicle is equal to or greater than a predetermined value. As a result, it is possible to improve safety in the case where the driving is taken over from the driver A to the driver B.

Third Embodiment

Explanation follows regarding a third exemplary embodiment of the present disclosure. Since the third embodiment has the same configuration as that of the first embodiment, the same reference numerals are given to the same respective portions, and the description of those similar portions is omitted. Hereinafter, with reference to FIG. 4, portions of the operation mode control processing according to the third embodiment which are different from the operation mode control processing of FIG. 2 described in the first embodiment are explained.

In the operation mode control process according to the third embodiment, when the determination of step 108 is affirmed by the automatic operation possible flag of the automatic operation control unit 28 being turned on, the process proceeds to step 109. Then, in step 109, the driving handover control unit 30 determines whether or not the driver B has completed preparations to drive the vehicle, in the same manner as in the second embodiment. If the determination in step 109 is negative, the determination in step 109 is repeated until the determination in step 109 is affirmative. If the determination in step 109 is affirmative, the process proceeds to step 120.

In the third embodiment, when the driver B completes preparations for driving the vehicle, a preliminary driving operation is performed by the driver B. In step 120, the driving handover control unit 30 acquires operation information indicating the operation amount of the driving operation performed by the driver A from the occupant driving operation unit 18 or the remote driving operation unit 38 and acquires operation information indicating the operation amount of the preliminary driving operation performed by the driver B from the occupant driving operation unit 18 or the remote operation unit 38. Then, the driving handover control unit 30 calculates an evaluation value for evaluating a difference between the driving operations of the driver A and the driver B based on the obtained operation information, and determines whether the calculated evaluation value is equal to or more than a threshold value.

If the result of the determination in step 120 is affirmative, the process proceeds to step 122. In step 122, although the driving handover control unit 30 causes transition of the driving mode of the vehicle from the occupant driving mode or the remote driving mode by the driver A to the automatic driving mode, at this time, automatic driving control unit 28 performs control such that automatic driving corresponding to between the driving operation by the driver A and the driving operation by the driver B is performed by the automatic driving control unit 28. As an example of the automatic driving corresponding to between the driving operation by the driver A and the driving operation by the driver B, there is automatic driving corresponding to the average of the driving operation by the driver A and the driving operation by the driver B.

For example, in the case that driver A tends to drive such that the vehicle travels at a position at the left in the lane, while driver B tends to drive such that the vehicle travels at a position at the right position in the lane, the driving handover control unit 30 controls the automatic drive control unit 28 so that automatic drive in which the vehicle travels near the center in the lane is performed by the automatic drive control unit 28. Thereby, when changing the driving mode of the vehicle from the occupant driving mode or the remote driving mode by the driver A to the automatic driving mode, and when shifting from the automatic driving mode to the occupant driving mode or the remote driving mode by the driver B, significant change in the behavior of the vehicle is suppressed.

In step 122, in the case that the driving mode of the vehicle is changed from the occupant driving mode or the remote driving mode by the driver A to the automatic driving mode, when the driver B performs operation 2 meaning that the driver B indicates an intention to drive the vehicle, the determination in the next step 114 is affirmed, and the process proceeds to step 124. In step 124, the driving handover control unit 30 changes the driving mode of the vehicle to the occupant driving mode by the driver B or the remote driving mode. In this case, the driving mode of the vehicle changes from the occupant driving mode or the remote driving mode by the driver A, which is the first state, to the occupant driving mode or the remote driving mode by the driver B, which is the second state, via the automatic driving mode, which is the third state.

On the other hand, if the determination in step 120 is negative, step 122 is skipped and the process proceeds from step 120 to step 114. In this case, the driving mode of the vehicle changes from the occupant driving mode or the remote driving mode by the driver A, which is the first state, to the occupant driving mode or the remote driving mode by the driver B, which is the second state, without going through the automatic driving mode, which is the third state.

As described above, in the third embodiment, in the automatic driving mode, the driving handover control unit 30 causes the automatic operation control unit 28 to perform automatic operation of the operation amount corresponding to between the driving operation by the driver A detected by the occupant driving operation unit 18 or the remote driving operation unit 38 and the preliminary driving operation performed by the driver B. Thereby, when changing the driving mode of the vehicle from the occupant driving mode or the remote driving mode by the driver A to the automatic driving mode, and when shifting from the automatic driving mode to the occupant driving mode or the remote driving mode by the driver B, significant change in the behavior of the vehicle can be suppressed.

In the third embodiment, when the evaluation value, which evaluates the difference between the driving operation by the driver A and the preliminary driving operation by the driver B detected by the occupant driving operation unit 18 or the remote operation unit 38, is less than the threshold value, the driving handover control unit 30 changes the driving mode of the vehicle from the occupant driving mode or the remote driving mode by the driver A to the occupant driving mode or the remote driving mode by the driver B without passing through the automatic driving mode. In this case, the handover from the driver A to the driver B can be completed in a short time while avoiding a large change in the behavior of the vehicle.

In the third embodiment, even when the evaluation value, which evaluates the difference between the driving operations of the driver A and the driver B, is less than the threshold value, transition may be made from the operation by the driver A, which is the first state, to driving by the driver B, which is the second state, via the automatic driving mode, which is the third state.

In the above description, although the mode in which the driver detection unit 20 or the remote driver detection unit 40 detects a driver abnormality is described, detecting the driver abnormality is not an essential requirement, and the driver detection unit 20 or the remote driver detection unit 40 may not be provided with a function of detecting a driver abnormality.

An object of the present disclosure is to obtain a driving handover control device capable of suppressing interference between a driving operation of a first driver and a driving operation of a second driver.

The driving handover control device according to a first aspect includes a memory and a processor coupled to the memory, wherein, in a case in which driving is handed over from a first state in which a vehicle is traveling by remote driving by a first driver from outside the vehicle or by occupant driving by the first driver in the vehicle, to a second state in which the vehicle travels by the remote driving or the occupant driving by a second driver who is different from the first driver, the processor is configured to cause transition from the first state to a third state in which the vehicle is caused to travel by automatic driving, and then cause transition from the third state to the second state.

In the first aspect, in the case of handing over driving of the vehicle, transition is caused from the first state, in which the vehicle is traveling by remote driving or occupant driving by the first driver, to the third state, in which the vehicle is caused to travel by automatic driving, and then transition is caused from the third to the second state in which the vehicle travels by remote driving or occupant driving by the second driver. Thereby, it is possible to suppress interference between the driving operation of the first driver and the driving operation of the second driver, and it is possible to suppress the drivers from feeling uncomfortable.

The driving handover control device according to a second aspect is the driving handover control device according to the first aspect, wherein the processor is configured to cause transition from the first state to the third state in a case in which the automatic driving is possible, and to cause transition from the third state to the second state in a case in which the remote driving or the occupant driving by the second driver is possible and the second driver has indicated an intention to drive the vehicle.

In the second aspect, it is possible to cause a quick transition from the first state to the third state under the condition that the automatic driving is possible. Further, in the second aspect, transition from the third state to the second state can be caused while ensuring safety under the condition that the remote driving or the occupant driving by the second driver is possible and the second driver has indicated an intention to drive the vehicle.

The driving handover control device according to a third aspect is the driving handover control device according to the first aspect, wherein the processor causes transition from the first state to the third state in a case in which the automatic driving is possible and the remote driving or the occupant driving by the second driver is possible, and the processor causes transition from the third state to the second state in a case in which the second driver has indicated an intention to drive the vehicle.

In the third aspect, it is possible to cause transition from the first state to the third state while ensuring safety under the condition that automatic driving is possible and remote driving or occupant driving by the second driver is possible. Further, in the third aspect, it is possible to cause a quick transition from the third state to the second state under the condition that the second driver has indicated an intention to drive the vehicle.

The driving handover control device according to a fourth aspect is the driving handover control device according to the first aspect, wherein the processor is further configured to detect a driving operation by the first driver in the first state and detect a preliminary driving operation performed by the second driver in the second state, and, in the third state, the processor causes automatic driving of an operation amount corresponding to an amount between the detected driving operation by the first driver and the detected preliminary driving operation by the second driver.

There is a tendency for characteristics depending on a driver in driving, for example, one driver having a tendency to drive such that the vehicle travels at a position at the left in the lane, while another driver having a tendency to drive such that the vehicle travels at a position at the right position in the lane. In the case that the driver that drives the vehicle is switched, the behavior of the vehicle may significantly change depending on the combination of the driving tendency of the driver before the switching and the driving tendency of the driver after the switching.

In this regard, in the fourth aspect, a preliminary driving operation is performed by the second driver in the second state, and, in the third state, automatic driving of an operation amount corresponding to an amount between the driving operation by the first driver and the preliminary driving operation by the second driver is performed. Thereby, when transitioning from the first state to the third state, and when transitioning from the third state to the second state, it is possible to suppress significant change in the behavior of the vehicle.

The driving handover control device according to a fifth aspect is the driving handover control device according to the first aspect, wherein the processor is further configured to detect a driving operation by the first driver in the first state and detect a preliminary driving operation performed by the second driver in the second state, and, in a case in which an evaluation value, which evaluates a difference between the detected driving operation by the first driver and the detected preliminary driving operation by the second driver, is less than a threshold value, the processor causes transition from the first state to the second state without going through the third state.

According to the fifth aspect, in a case in which the evaluation value, which evaluates a difference between the driving operation by the first driver and the preliminary driving operation by the second driver, is less than a threshold value, it is possible to hand over driving from the first driver to the second driver in a short time while avoiding a significant change in the behavior of the vehicle.

The driving handover control device according to a sixth aspect is the driving handover control device according to the first aspect, wherein, in a case in which transition to the second state has been completed, the processor notifies the first driver that responsibility of driving the vehicle has been transferred to the second driver.

According to the sixth aspect, when transition to the second state has been completed, the first driver can be made aware that responsibility for driving the vehicle has been transferred to the second driver.

The driving handover control device according to a seventh aspect is the driving handover control device according to the first aspect, wherein, a case in which driving is handed over from the first driver to the second driver is a case in which any of a first condition that a predetermined operation, which includes the first driver requesting handover of driving, is performed, a second condition that a predetermined driving handover time from the first driver to the second driver has arrived, or a third condition that an abnormality of the first driver is detected, is satisfied.

According to the seventh aspect, in a case in which it is desirable to handover driving from the first driver to the second driver, that is, in a case in which any of the first to third conditions is satisfied, handover of driving from the first driver to the second driver can be performed.

The driving handover control device according to an eighth aspect is the driving handover control device according to the seventh aspect, wherein, a case in which driving is handed over from the first driver to the second driver is a case in which any of the first condition to the third condition is satisfied and an inter-vehicular distance between the vehicle and another vehicle is greater than a predetermined value.

According to the eighth aspect, it is possible to improve safety in a case in which driving is handed over from the first driver to the second driver.

According to the present disclosure, it is possible to suppress interference between the driving operation of the first driver and the driving operation of the second driver.

The invention claimed is:

1. A driving handover control device, comprising:
   a memory; and
   a processor coupled to the memory, wherein
   in a case in which driving is handed over from a first state in which a vehicle is traveling by remote driving by a first driver from outside the vehicle, to a second state in which the vehicle travels by the remote driving by a second driver from outside the vehicle or by occupant driving by the second driver in the vehicle and who is different from the first driver, the processor is configured to cause transition from the first state to a third state in which the vehicle is caused to travel by automatic driving, and then cause transition from the third state to the second state,
   the processor is further configured to detect a driving operation by the first driver in the first state and detect a preliminary driving operation performed by the second driver in the second state,
   in a case in which an evaluation value, which evaluates a difference between the detected driving operation by the first driver and the detected preliminary driving operation by the second driver, is less than a threshold value, the processor causes transition from the first state to the second state without going through the third state, and
   in a case in which the evaluation value is equal to or greater than the threshold value, the processor causes the transition from the first state to the third state and then from the third state to the second state.

2. The driving handover control device according to claim 1, wherein the processor is configured to:
   cause the transition from the first state to the third state at a time at which the automatic driving is possible, and
   cause the transition from the third state to the second state at a time at which the remote driving or the occupant driving by the second driver is possible and the second driver has indicated an intention to drive the vehicle.

3. The driving handover control device according to claim 1, wherein:
   the processor causes the transition from the first state to the third state at a time at which the automatic driving is possible and the remote driving or the occupant driving by the second driver is possible, and
   the processor causes the transition from the third state to the second state at a time at which the second driver has indicated an intention to drive the vehicle.

4. The driving handover control device according to claim 1, wherein:
   in the third state, the processor causes automatic driving of an operation amount corresponding to an amount between the detected driving operation by the first driver and the detected preliminary driving operation by the second driver.

5. The driving handover control device according to claim 1, wherein:
   in a case in which the transition to the second state has been completed, the processor is configured to notify the first driver that responsibility of driving the vehicle has been transferred to the second driver.

6. The driving handover control device according to claim 1, wherein:
   the processor determines that driving is to be handed over from the first driver to the second driver upon satisfaction of any of (i) a first condition that a predetermined operation, which includes the first driver requesting handover of driving, is performed, (ii) a second condition that a predetermined driving handover time from the first driver to the second driver has arrived, or (iii) a third condition that an abnormality of the first driver is detected.

7. The driving handover control device according to claim 6, wherein:
   the processor determines that driving is to be handed over from the first driver to the second driver upon satisfaction of any of the first condition to the third condition and when an inter-vehicular distance between the vehicle and another vehicle is greater than a predetermined value.

8. A driving handover control method, comprising:
   by control of a processor,
   in a case in which the processor determines that driving is to be handed over from a first state in which a vehicle is traveling by remote driving by a first driver from outside the vehicle, to a second state in which the vehicle travels by the remote driving by a second driver from outside the vehicle or by occupant driving by the second driver in the vehicle and who is different from the first driver, the processor causes transitioning from the first state to a third state in which the vehicle is caused to travel by automatic driving, and then the processor causes transitioning from the third state to the second state, wherein
   the processor detects a driving operation by the first driver in the first state and a preliminary driving operation performed by the second driver in the second state,
   in a case in which an evaluation value, which evaluates a difference between the detected driving operation by the first driver and the detected preliminary driving operation by the second driver, is less than a threshold value, the processor causes transition from the first state to the second state without going through the third state, and
   in a case in which the evaluation value is equal to or greater than the threshold value, the processor causes the transitioning from the first state to the third state and then from the third state to the second state.

9. The driving handover control method according to claim 8, wherein:
   the processor causes the transitioning from the first state to the third state at a time at which the automatic driving is possible, and
   the processor causes the transitioning from the third state to the second state at a time at which the remote driving or the occupant driving by the second driver is possible and the second driver has indicated an intention to drive the vehicle.

10. The driving handover control method according to claim 8, wherein:
    the processor causes the transitioning from the first state to the third state at a time at which the automatic driving is possible and the remote driving or the occupant driving by the second driver is possible, and
    the processor causes the transitioning from the third state to the second state at a time at which the second driver has indicated an intention to drive the vehicle.

11. The driving handover control method according to claim 8, wherein:
   in the third state, the processor causes automatic driving of an operation amount corresponding to an amount between the detected driving operation by the first driver and the detected preliminary driving operation by the second driver.

12. The driving handover control method according to claim 8, wherein:
   in a case in which the transitioning to the second state has been completed, the processor causes the first driver to be notified that responsibility of driving the vehicle has been transferred to the second driver.

13. The driving handover control method according to claim 8, wherein:
   the processor determines that driving is to be handed over from the first driver to the second driver upon satisfaction of any of (i) a first condition that a predetermined operation, which includes the first driver requesting handover of driving, is performed, (ii) a second condition that a predetermined driving handover time from the first driver to the second driver has arrived, or (iii) a third condition that an abnormality of the first driver is detected.

14. The driving handover control method according to claim 13, wherein:
   the processor determines that driving is to be handed over from the first driver to the second driver upon satisfaction of any of the first condition to the third condition and when an inter-vehicular distance between the vehicle and another vehicle is greater than a predetermined value.

* * * * *